Figure 1:
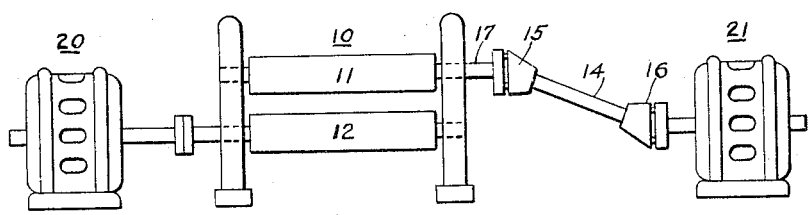

July 4, 1933.  W. B. SHIRK  1,916,443

POWER TRANSMISSION SYSTEM

Filed June 18, 1929

INVENTOR
William B. Shirk
BY
Wesley G. Carr
ATTORNEY

Patented July 4, 1933

1,916,443

UNITED STATES PATENT OFFICE

WILLIAM B. SHIRK, OF WILKINSBURG, PENNSYLVANIA, ASSIGNOR TO WESTINGHOUSE ELECTRIC & MANUFACTURING COMPANY, A CORPORATION OF PENNSYLVANIA

POWER TRANSMISSION SYSTEM

Application filed June 18, 1929. Serial No. 371,760.

My invention relates, generally, to power-transmission systems and more particularly to power systems for operating rolling mills and similar machines, wherein the individual elements of the machines are operated by means of separate motors.

One object of my invention, generally stated, is to provide a power system for rolling mills which shall be simple and efficient in operation and readily and economically manufactured and installed.

A more specific object of my invention is to provide for maintaining a predetermined load balance and speed ratio between the motors individually connected to separate work devices or elements of a machine, which cooperate to determine the total load, without utilizing a rigid mechanical connection between the motors.

Another object of my invention is to provide for driving the rolls of a rolling mill by means of individual motors connected to the respective rolls and for maintaining the relative peripheral speeds of the cooperating roll members in a predetermined ratio, regardless of changes in the total load and predetermined changes in the relative speeds of the motors.

Figure 2:
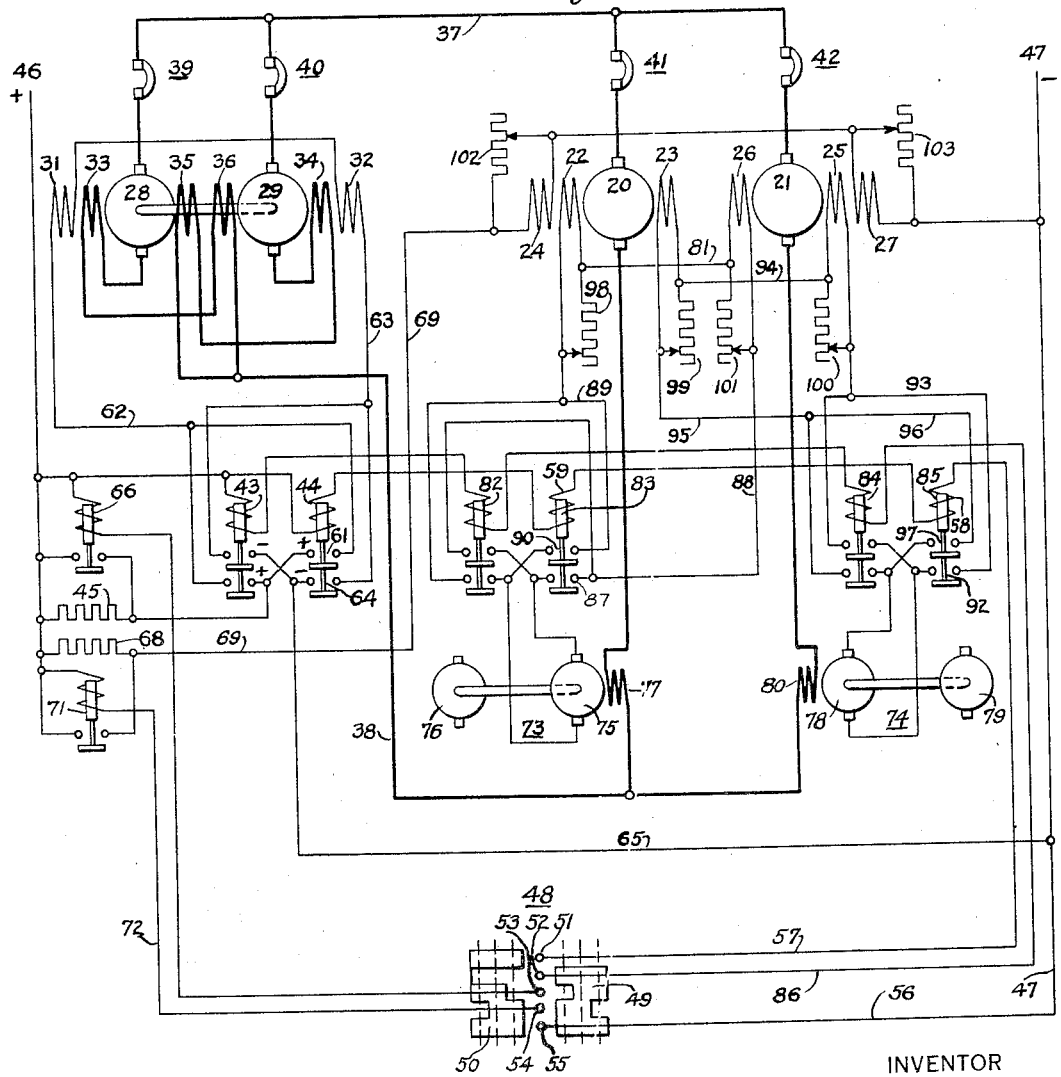

Other objects and advantages of my invention will become evident from the following description, taken in conjunction with the drawing, in which:

Figure 1 is a view, in end elevation, of a rolling mill provided with individual roll-driving motors; and Fig. 2 is a diagrammatic view of a power-transmission system for an electric-rolling mill drive embodying the features of my invention.

Referring now to the drawing, the structure shown in Fig. 1 represents a well-known type of rolling mill for which my invention is especially adapted. As shown, the mill, designated generally at 10, comprises a plurality of horizontal rolls 11 and 12 which are usually of the same diameter. In accordance with the usual practice, the lower roll 12 is stationarily mounted and the upper roll 11 is adjustably mounted to provide for the accommodation of metal or other material, which may vary in thickness within predetermined limits. As is well known, a suitable screw-down mechanism is commonly utilized for adjusting the top roll of the mill. However, in this instance, it is deemed unnecessary to illustrate a suitable screw-down mechanism, since its operation is well known and it forms no part of the present invention.

In order that the top roll 11 may be adjusted vertically with respect to the lower roll 12, it is connected to its driving motor by means of a flexible driving means comprising a shaft 14 and universal-joint members 15 and 16 which are disposed to be connected to the roll spindle 17 and the motor shaft, as shown.

The rolls 11 and 12 of the mill may be operated by motors of any suitable type, individually connected to each roll, as shown. In this particular instance, direct-current motors 20 and 21 are utilized. The motor 20 is provided with compounding-field windings 22 and 23 and a main field winding 24; the motor 21 is likewise provided with compounding-field windings 25 and 26 and a main field winding 27.

The roll motor 20 and 21 may be supplied with power from any suitable source of direct-current energy. However, in this embodiment of the invention, a plurality of mechanically-connected generators 28 and 29, which may be driven by a suitable prime mover, are utilized. The generators are provided with separately excited main field windings 31 and 32, differential compounding-field windings 33 and 34 and cumulative compounding-field windings 35 and 36.

As shown, the generators are connected in parallel-circuit relation to the buses 37 and 38 through suitable circuit breakers 39 and 40. Likewise, the motors are connected in parallel-circuit relation to receive power from the buses 37 and 38 through circuit breakers 41 and 42.

In order to control the division of load between the generators 28 and 29, provision is made for varying the field excitation of one generator in response to the variation in load of the other in accordance with well-known practice. In this instance, this function is accomplished by cross-connecting the cumulative compounding-field windings 35 and 36. As shown, the differential-field winding 33 of the generator 28 is connected in series with the cumulative-field winding 36 of the generator 29, and the differential-field winding 34 of the generator 29 is connected in series with the cumulative-field winding 35 of the generator 28, thereby rendering the excitation produced by the cumulative-field winding of each generator responsive to the load on the other.

The field produced by the differential compounding-field winding of each machine is balanced by the field produced by its cumulative compounding-field winding when the generators are dividing the total load in a predetermined ratio. Therefore, it will be readily understood that, when one generator assumes more than its share of the load, its differential-field winding functions to reduce the total excitation of the machine while the cumulative-field winding on the lightly-loaded machine functions to strengthen its field excitation which causes the generator with the greater load to relinquish a part of its load to the other generator until a balance is established.

In this instance, the generator voltage is controlled by varying the excitation of their separately-excited main field windings 31 and 32. In order to control the amount and the direction of flow of exciting current in the main field windings of the generators, a plurality of field-reversing switches 43 and 44, and a field resistor 45, are utilized. As shown, the main field windings 31 and 32 are connected in series-circuit relation to a separate source of power which may be illustrated by line conductors 46 and 47 through a circuit comprising the field resistor 45 and field-reversing switches 43 and 44, which will be described in detail hereinafter.

A master switch, shown generally at 48 and having drum segments 49 and 50 and stationary contact fingers 51 to 55, inclusive, is provided for effecting the operation of the various control switches provided in the system.

In order that the dominant features of my invention may be more readily understood, the operation of the system will now be described in detail. For the purpose of explanation, it will be assumed that the generators 28 and 29 are being driven by their prime mover (not shown) in the usual manner. Therefore, in order to cause the generators to develop a voltage, the master switch 48 may be actuated in either direction to effect the operation of the field-reversing switches and thereby establish a field-excitation circuit for the generators in the proper direction.

Assuming that the master switch 48 is actuated to the first position forward, then the drum segment 50 engages contact finger 51 and establishes an operating circuit for the field-reversing switch 44, which may be traced from the line conductor 47, through conductor 56, contact fingers 51 and 55 bridged by the segment 50—conductor 57, switch-operating coils 58 and 59 and operating coil of the switch 44, to the line conductor 46. Accordingly, upon the closure of reversing switch 44, an energizing circuit for the main field windings 31 and 32 is established which may be traced from the line conductor 46, through the field resistor 45, contact members 61, conductor 62, main field windings 31 and 32, conductor 63, contact members 64, and conductor 65, to the line conductor 47.

The voltage of the generators may be further increased to increase the speed of the motors 20 and 21, upon movement of the master switch to the second position where the drum segment 50 engages the contact finger 53 and establishes an operating circuit for the switch 66, which is disposed to bridge the field resistor 45. Upon the closure of the switch 66, the exciting current flowing in the main field circuit of the generators is increased, thereby effecting a predetermined increase in the voltage of the generators.

It is evident that the voltage of the generators may be increased, in as many steps as desired, by utilizing a plurality of bridging switches, similar to the switch 66, for varying the resistance of the generator main field circuit. However, in this instance, only a single point of speed control by generator voltage control is shown, in order to simplify the drawing.

In the operation of motors in systems of this kind, it is desirable to produce the predominating or main field flux by means of separately excited main field windings in order that the relative speeds and torques of the motors may be readily controlled. Therefore, in this embodiment of the invention, the main field windings 24 and 27 of the motors 20 and 21, respectively, are disposed to be supplied with exciting current through a circuit extending from line conductor 46, through a field resistor 68, conductor 69, and main field windings 24 and 27, connected in series, to line conductor 47.

When the main field windings of the motors are excited in this manner, an additional point or points of speed control may be obtained by varying the amount of exciting current flowing in the main field circuit of the motors, in as many steps as desired. In this instance, a single resistor-bridging switch 71 is provided for obtaining a single point of speed control by varying the main field excitation of the motors in a one-step operation.

In order to provide maximum main field excitation to start the motors, provision is made for retaining the bridging switch 71 in the closed position during the initial starting period and until the master-switch drum has been actuated to a predetermined position. As shown, the drum segment 50 engages the contact finger 54 when the master switch 48 is actuated to the first position, in either the forward, or reverse direction, to establish an operating circuit through conductor 72 for the switch 71. In this instance, the operating circuit for the switch is maintained until the master switch moves to the fourth position, where the circuit is interrupted, as shown, to cause the bridging switch 71 to open and remove the bridging connection from the field resistor 68.

It will be readily understood that, in the application of motors to drives of this character, it is necessary to provide for maintaining a predetermined speed ratio between the motors, since they have no rigid mechanical connection other than the metal extending between the rolls of the mill. Furthermore, it is necessary to provide for maintaining a predetermined load ratio which is determined by the relative capacities of the motors.

The rolls of the mill are usually of the same diameter and, consequently, the motors are required to run at the same speed. However, in some instances, it may be desirable to use rolls which are not of the same diameter and, consequently, the motors must be operated at such relative speeds as to maintain the peripheral speeds of the rolls equal. However, in any case, whether the rolls are of the same diameter or not, the speed of the motors must be maintained in a predetermined ratio in order that the metal may properly enter the rolls, and that a uniform working of the metal may be obtained as it passes through the rolls.

It will be apparent that the load ratio of the motors must be maintained in order to obtain stability in the system and to prevent the unnecessary overloading of either motor when the total load changes. In this instance, the motors are mechanically connected through the medium of the metal or other material which is engaged by the rolls associated with each of the motors. This does not constitute a rigid mechanical connection and, in the event the load becomes unbalanced, an unstable operating condition is at once established which, if not corrected, becomes cumulative in its effect. The effect of the continuance of the unstable condition is to cause the load to become unbalanced to such an extent that one motor would attempt to carry the total rolling load which would be greatly beyond its rating, while the other motor would carry only a small load. Furthermore, the cumulative effect of the unstable condition would ultimately bring about a condition in which one motor would function as a generator, receiving power from the other motor through the roll members acting as a mechanical transmission.

In this embodiment of the invention, the motors 20 and 21 are provided with separate exciter sets 73 and 74, disposed to cooperate in the control of the relative field excitations of the motors in response to variation of load current in the motor circuits.

As shown, the exciter set 73 comprises an exciter 75 which is disposed to be driven at a substantially constant speed by any suitable motor 76. The exciter 75 is provided with a field winding 77 connected in series-circuit relation to the armature of the motor 20. The exciter set 74 comprises an exciter 78 disposed to be driven at a substantially constant speed by any suitable motor 79 and is provided with a field winding 80 connected in series-circuit relation to the armature of the motor 21.

In this instance, exciters of the kind utilized are known as series exciters, since they are provided with series-type field windings of suitable capacity for carrying the full-load currents of the motors. Therefore, it will be readily understood that, since the exciters 73 and 74 are driven at substantially constant speed by their respective motors, their generated voltage will vary in substantially the same proportion as the load current flowing through their respective field windings 77 and 80.

In order to maintain a proper division of load between the motors, it is necessary to provide a balancing force in the system which becomes effective immediately in response to the occurrence of a load unbalance.

In this instance, when referring to load balance, it is intended that it shall be interpreted to mean the maintaining of a predetermined division of load and not necessarily an equal division of the load.

In this embodiment of the invention, the balancing force or corrective effect, as it may be conveniently termed, is provided by controlling the relative field excitation of the motors, in response to the load currents flowing in their respective circuits, to obtain a balanced field condition.

The balanced field condition exists primarily between the motors when they are dividing the load in the desired ratio although, in some instances, the fields produced by the compounding-field windings of each machine may also exactly balance and produce no effect upon the main field. When it is not desired to control the speed regulation of the motors, the compounding fields in each motor may be exactly balanced or either may predominate to affect the main field in such manner as to cause the motors to operate with a rising, flat or drooping speed characteristic, as will appear from the following description.

In order to control the relative field excitation of the motors in response to their respective loads, provision is made for connecting the cumulative compounding-field winding of each motor in series-circuit relation to the differential-compounding-field winding of the other motor and across the series exciters of the respective motors. As shown, the cumulative-field winding 22 of the motor 20 is connected in series-circuit relation to the differential field winding 26 of the motor 21 by means of conductor 81 and across the armature of the exciter 73 through field-reversing switches 82 and 83. In like manner, the cumulative-field winding 25 of the motor 21 is connected in series-circuit relation to the differential-field winding 23 of the motor 20 and across the armature of exciter 74 through reversing switches 84 and 85. The purpose of the reversing switches, in this instance, is to maintain the fields produced by the compounding-field windings in the same direction as that produced by the main field windings 24 and 27 when the motors 20 and 21 are reversed by reversing the generator voltage. As is well understood, the reversal of the generator voltage in this manner effects a reversal of the armature current of the motors and, consequently, the voltages developed by the series exciters 73 and 74 are also reversed to cause the exciting currents to flow in the field circuits in the wrong direction, unless the exciter connections are also reversed.

In order to maintain the field produced by the compounding-field windings in the proper direction, with respect to the main field, provision is made for effecting the closure of the proper field-reversing switches in accordance with the direction in which the master switch is actuated.

When the master switch 48 is actuated to the first position to engage the contact finger 51, an operating circuit for the generator field-reversing switch 44 is established, and the circuit extends through the operating coils of the reversing switches 85 and 83.

In a similar manner, when the master switch 48 is actuated in the reverse direction to engage the contact finger 52, an operating circuit for the generator field-reversing switch 43 is established which extends from the line conductor 47, through conductor 56, contact fingers 55 and 52—bridged by the segment 49—conductor 86, operating coils of the generator field-reversing switches 84 and 82 and the operating coil of the switch 43, to the line conductor 46.

Considering the first example described hereinbefore, where it is desired only to control the load balance between the motors, without maintaining a constant operating speed, the fields produced by the compounding-field windings of each motor are exactly balanced when the motors are dividing the load in a predetermined ratio, and consequently, the main fields produced by the main-field windings are not affected in any manner. However, for the purpose of illustration, it may be assumed that the total load becomes greater, and for some reason, the motor 20 assumes more load than its proportionate share. A condition of this kind occurs when the metal that is fed to the rolls is of higher temperature on the one than on the other side, causing the roll which operates upon the cooler side of the metal to do more work and, consequently, its driving motor must develop a greater torque. In this event, the increase of load current flowing through the exciter field 77 causes a proportionate increase in the exciter voltage. Assuming that a field-excitation circuit has been established through the closure of the reversing switch 83, then the excitation current flows from one terminal of the exciter 75, through contact members 87, conductor 88, differential-field winding 26, conductor 81, cumulative-field winding 22, conductor 89 and contact members 90, to the opposite terminal of the exciter 75.

At the same time, exciting current is flowing from the exciter 78, through contact members 92, conductor 93, cumulative-field winding 25, conductor 94, differential-field winding 23, conductors 95 and 96, and contact members 97, to the opposite terminal of the exciter 78. However, since the current flowing through the field winding 80, of the exciter 78 has not changed, the exciting current produced by the two exciters will vary from their initial ratio, causing the cumulative-field winding 22 of the motor 20 to produce a flux adding to that produced by the main field winding 24 and the differential-field winding 26 of the motor 21 to produce a flux in opposition to that produced by the main field winding 25. It is evident that the increase in total excitation of the motor 20 permits it to develop a greater torque, while a decrease in the total excitation of the motor 21 causes a decrease in its torque. When this condition is established, the speed of the motor 20 is increased, since its torque is now greater than that demanded by the load, thereby developing a higher counter-electromotive force which shifts the load to the motor 21 which is in a condition to assume additional load since its total field excitation and, consequently, its counter-electromotive force, has been reduced.

It will be readily understood that, as the load current of the motor 21 increases, the voltage generated by its series exciter 78 will, accordingly, increase to cause the load to tend to shift back again to the motor 20. The resultant effect, however, is that this balancing action continues and is maintained in constant operation to maintain a predetermined load balance between the motors.

In some instances, it may be desired to control the speed characteristics of the motors in addition to maintaining a load balance. In ordinary rolling operations, this is not necessary, however. In the event the mill is being operated in tandem with another mill, it becomes necessary to maintain a substantially constant speed, regardless of the load.

When the motors are operating without regard to speed control, as described hereinbefore, the compounding-fields in each motor are balanced, and the motor operates as a separately-excited motor. As is well known, a shunt motor, strictly speaking, does not have a flat speed characteristic. It may have a rising or a drooping characteristic, causing it to raise or lower its speed with increase in load.

In this event, the speed characteristic may be controlled by varying the compounding effect produced by the cumulative and differential compounding-field windings. Accordingly, a plurality of field rheostats 98 to 101, inclusive, are provided for varying the excitation of the compounding-field windings 22, 23, 25 and 26, respectively.

It will be readily understood that, by adjusting the rheostats, either of the compounding fields produced in each motor may be caused to predominate, consequently either aiding or opposing the main field excitation to produce the desired speed characteristic.

It is evident that, when the motors are operating under this condition, the compounding fields are unbalanced within the motor itself. However, so long as the unbalance is the same for each motor, the load-balancing operation—as described in detail hereinbefore—is not affected. The effect produced in this instance is equivalent to a variation in the shunt-field excitation and, if the effect is the same in both motors, an unbalance in load causes the series exciters to function in exactly the same manner as if the compounding field of each motor were balanced.

In order to provide for individually varying the excitation produced by the main field windings 24 and 27 of the motors 20 and 21, respectively, field rheostats 102 and 103 are utilized.

As will be readily understood, the provision of field rheostats 102 and 103 enables the operator to initially adjust the relative speeds of the motors to a predetermined ratio, which, as set forth hereinbefore, is determined by the diameters of the respective rolls.

Since the reducing force applied to the metal by each roll must be the same, in order to obtain a uniform rolling action, it follows that the torque which must be applied to each roll varies in direct proportion with the roll diameter. The speed of the rolls, however, must vary inversely with roll diameter in order to maintain the initial peripheral speed. Therefore, it is evident that the horsepower delivered by the roll motors remains constant for a fixed set of rolling conditions.

Since the horsepower delivered by the motors 20 and 21 remains constant, the load current ratio also remains constant and, therefore, the series exciters 73 and 74 maintain the balanced field condition regardless of whether or not the motors are operated at the same speed.

Therefore, it is evident that the balanced-field condition, which provides the stabilizing force in the system, is inherently maintained, regardless of the speed ratio of the roll motors 20 and 21.

It may be stated in conclusion that, while the illustrated example constitutes a practical embodiment of my invention, I do not wish to limit myself strictly to the exact details herein illustrated, since modifications of the same may be made without departing from the spirit of the invention, as defined in the appended claims.

I claim as my invention:

1. In a power-transmission system, the combination with a rolling mill and a plurality of motors individually connected to the rolls of the mill, of a source of power for the motors, said motors being connected in parallel-circuit relation to the power source, each motor having a separately excited main field winding and a plurality of series-compounding field windings, means for controlling the excitation of the main field windings to determine the relative speeds of the motors, an exciter for each motor for supplying exciting current to the series-compounding fields in accordance with the load on the different motors, and means for connecting one series-compounding field winding of each motor in series-circuit relation to each exciter, said series-compounding field windings of each motor being connected for establishing a field flux in opposite directions, thereby to provide a resultant flux to vary the effectiveness of the main field flux in response to an unbalance of the system.

2. In a power system, in combination, a plurality of motors disposed to divide a load in a predetermined ratio, said motors being provided with main field and cumulative and differential compounding-field windings, a source of power for the motors, said motors being connected in parallel-circuit relation to the power source, manual means for individually controlling the excitation of the main field windings to predetermine the relative speeds of the motors, and automatically-operable means for controlling the excitation of the compounding-field windings, said means comprising a series exciter for each motor connected across the cumulative field of its respective motor in series-circuit relation to the differential-field winding of the other motor to effect a simultaneous unbalance of the compounding fields of each motor in response to a load unbalance, thereby to correct the load unbalance to the predetermined ratio.

3. In a power system, in combination, a plurality of motors disposed to divide a load in a predetermined ratio, said motors being provided with main field windings, cumulative and differential compounding-field windings and a separately-driven series exciter for each motor, said cumulative compounding-field winding of one motor being connected in series-circuit relation to the differential compounding-field winding of another motor across the exciter associated with the first motor, said series exciters being disposed to maintain a balance between the compounding fields of each motor when the motors divide the load in a predetermined ratio and to unbalance the compounding fields in a predetermined direction when the load ratio varies, thereby to cause the development of a differential torque between the motors to correct the load unbalance.

4. The combination with a rolling mill provided with a pair of reducing rolls and motors mechanically connected to each roll, said motors being mechanically connected together when the metal enters the rolls, of a plurality of generators for supplying power to the motors, said motors having both differential and cumulative compounding-field windings, the cumulative-field winding of one motor being connected in series with the differential-field winding of the other, and a separate exciter for each pair of series-connected field windings, each exciter being disposed to develop a voltage substantially proportional to the load of their respective motors to effect equal and opposite variations in the field excitation of both motors, thereby to produce a differential adjustment of their respective loads and speeds, simultaneously.

5. In an electric drive, the combination with a plurality of motors individually connected to the reducing rolls of a rolling mill and having main field windings and compounding-field windings, of a source of power for the motors, said motors being connected in parallel-circuit relation to the power source, an exciter for each motor, means for driving the exciters at a substantially constant speed, said exciters being disposed to develop a voltage proportional to the load on their respective motors, and means for connecting the compounding-field winding of one motor in series with a different compounding-field winding of the other motor across their respective exciters for simultaneously regulating the field excitation of both motors in accordance with their respective loads.

6. The combination with a plurality of motors disposed to individually operate cooperating elements of a work device and having main field windings and compounding-field windings, of a source of power for the motors, said motors being connected in parallel-circuit relation to the power source, and voltage-generating means operable to effect a variation in the field excitation of both motors simultaneously, said voltage-generating means being responsive only to the load currents of their respective motors, thereby to provide a continuously acting speed-regulating effect upon the motors when they are mechanically connected by means of material between the cooperating elements of the work device.

7. The combination with a rolling mill having individual roll-driving motors provided with main and compounding-field windings, of a plurality of generators for supplying power to the motors, said generators and motors being connected in parallel-circuit relation, an exciter for each motor, said exciters having field windings disposed to be energized in accordance with the load variation of their respective motors, each exciter being connected across a compounding-field winding of each motor to effect a predetermined change of excitation of all the motors in response to a variation in load of any one motor to maintain a predetermined load balance between the motors, a master switch for controlling the voltage of the generators to effect a reversal of the roll motors, and means responsive to the operation of the master switch to render the exciters effective to maintain a predetermined load balance when the motors are operating in either direction.

8. In a power system, in combination, a plurality of motors provided with main, cumulative compounding and differential-compounding-field windings, exciter means responsive to the load currents in the motors for maintaining a predetermined division of load between the motors, said means being disposed to vary the exciting current flowing in the compounding field windings of the motors in accordance with their loads, and manually-operable means for varying the excitation currents of the compounding-field windings to change the resultant flux produced by the main and compounding-field windings, in accordance with the desired speed, thereby to cause the motors to maintain a constant speed regardless of the load carried.

9. In a power system, in combination, a plurality of motors disposed to divide a load in a predetermined ratio, said motors being provided with separately-excited main, cumulative-compounding, and differential-compounding field windings, a source of power for the motors, said motors being connected in parallel-circuit relation to the power source, means for controlling the excitation of the main field windings to control the relative speeds of the motors, means for exciting the compounding-field windings in response to the load carried by the respective motors to maintain a predetermined division of load, and means for varying the relative excitation of the compounding-field windings of each motor to provide for unbalancing the fields produced by the compounding-field windings in each motor equally and in the same direction, thereby to control the speed regulation of the motors.

10. In a power system, in combination, a plurality of motors disposed to divide a common load in a predetermined ratio, a generator for supplying power to the motors, means for varying the direction and amount of voltage developed by the generator, said motors having separately-excited main field and differentially-related compounding-field windings, means operable to simultaneously vary the excitation of the main field windings, a series exciter responsive to the load on each motor, reversing switches for connecting each exciter to a predetermined compounding field winding of all the motors to provide for automatically maintaining a predetermined load balance between the motors and a master switch operable to simultaneously control the operation of the means for controlling the generator voltage and the reversing switches in the exciter circuits, thereby to render the series exciters effective to maintain the desired load division regardless of the direction of operation of the motors.

11. In a power system, in combination, a plurality of motors disposed to divide a load in a predetermined ratio, said motors being provided with separately-excited main, cumulative-compounding and differential-compounding field windings, a plurality of generators for supplying variable-voltage power to the motors, means including a master switch for controlling the direction and amount of voltage developed by the generators, a separately-driven series exciter for each motor, said series exciters being disposed to develop a voltage which is at all times proportional to the loads of their respective motors, and means for connecting the armature of each exciter in loop-circuit relation with the cumulative-compounding field winding of their respective motors and the differential-compounding field winding of the other motors, to provide for automatically maintaining the predetermined ratio of load between the motors, said means being responsive to the operation of the master switch to reverse the connection between each series exciter and the compounding field windings when the voltage of the generators is reversed.

12. In combination, a pair of roll members, a motor provided with a main field winding and cumulative and differential compounding field windings for actuating each roll, means for controlling the excitation of the main field windings to adjust the speed of the motors, and separately-driven generators disposed to develop a voltage proportional to the load currents of their respective motors for controlling the excitation of the compounding field windings in such manner as to effect predetermined opposite variations in the field strengths of the motors, in accordance with predetermined changes in their respective loads, thereby to automatically maintain a predetermined speed relation between the rolls.

13. In combination, a pair of roll members, a direct-current motor for actuating each roll member, each of said motors being provided with a main field winding and a pair of differentially-disposed auxiliary field windings, a source of power for the motors, a source of excitation current for the main field windings, an exciter for each motor, said exciters having field windings connected in series-circuit relation with the armatures of their respective motors, means for driving the exciters at a substantially constant speed, and means for connecting the armature of each exciter to a different auxiliary field winding of both motors, whereby the motors are caused to automatically maintain a predetermined load and speed ratio.

14. In combination, a pair of roll members, a direct-current motor for actuating each roll member, each of said motors being provided with a main field winding and a pair of differentially-disposed auxiliary field windings, a source of power for the motors, a source of excitation current for the main field windings, an exciter for each motor, said exciters having field windings connected in series-circuit relation with the armatures of their respective motors, means for driving the exciters at a substantially constant speed, a plurality of reversing switches for connecting the armature of each exciter to predetermined auxiliary field windings on both motors, and means for controlling the operation of the reversing switches.

15. In a power system, in combination, a plurality of dynamo-electric machines, each provided with main, cumulative-compounding and differential-compounding field windings, a source of power for the machines, means associated with each machine for energizing certain of the compounding field windings of all the machines in accordance with the load currents of the respective machines, and means for individually controlling the degree of excitation of the compounding field windings to provide for controlling the degree of compounding of the machines.

16. In a power system, in combination, a plurality of motors provided with main, cumulative-compounding and differential-compounding field windings, a source of power for the motors, voltage-generating means associated with each motor for supplying excitation current to one compounding field winding on each motor and a different compounding field winding on another motor in accordance with the respective motor load currents, and means operable to vary the relative amounts of excitation current flowing in the compounding field windings, whereby the resultant excitation produced by the main and compounding field windings of each motor may be varied.

In testimony whereof, I have hereunto subscribed my name this 15th day of June 1929.

WILLIAM B. SHIRK.